3,565,993
**INSECT CHEMOSTERILANT
METHOD—ACETAMIDES**
Philip C. Hamm, Glendale, Mo., assignor to Monsanto
 Company, St. Louis, Mo., a corporation of Delaware
No Drawing. Filed May 19, 1967, Ser. No. 639,657
Int. Cl. A01n 9/20
U.S. Cl. 424—320                                                  8 Claims

ABSTRACT OF THE DISCLOSURE

Compounds of the following formula are insect chemosterilants:

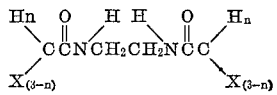

wherein X is a halogen and $n$ is an integer from zero to two inclusive.

---

This invention relates to methods for the control or eradication of insect populations.

The term "insect" is used herein in its broad common usage to include spiders, mites, ticks and like pests which are not in the strict biological sense classed as insects. Thus, the usage herein conforms to the definitions provided by Congress in Public Law 104, the "Federal Insecticide, Fungicide, and Rodenticide Act" of 1947, section 2, subsection h, wherein the term "insect" is used to refer not only to those small invertebrate animals belonging mostly to the class Insecta, comprising six-legged usually winged forms, such as beetles, bugs, bees, flies, and so forth, but also to other allied classes of arthropods whose members are wingless and usually have more than six legs, as spiders, mites, ticks, centipedes and wood lice.

In accordance with this invention it has been found that insects can be controlled or eradicated by a method which comprises exposing the insect to a sterilizing amount of a compound of the formula

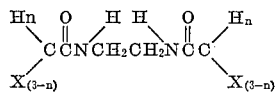

wherein X is halogen (Cl, Br, F and I) and $n$ is an integer from zero to two inclusive.

For the sake of brevity, the acetamides of the above formula which are useful in the methods of this invention are referred to hereinafter as "chemosterilants."

In carrying out the methods of this invention, the chemosterilants, admixtures thereof or compositions containing them are applied to the insects or to their environment in an amount sufficient to exert a sterilizing action. Chemosterilant compositions generally contain from 0.001% to about 99.99% by weight of chemosterilant. The lower concentrations of chemosterilant are particularly effective when the compositions are liquid, but it is preferred to use higher concentrations of chemosterilant when the compositions are semi-solid or solid. Compositions comprising from about 0.001% to about 5% by weight of chemosterilant are preferred with those comprising from about 0.001% to about 2% by weight being particularly advantageous. A wide variety of insects, for example, house flies (*Musca domestica*), screw-worm flies (*Cochliomyia hominivorax*), Mexican fruit flies (*Anastrepha ludens*), oriental fruit fly, vinegar flies, eye gnats, stable flies, mosquitoes, boll weevils, pomace flies (*Drosophila melanogaster*), Mediterranean fruit flies, cotton bollworm, codling moth, plum curculio, and the like, can be controlled or eradicated in accordance with the methods of this invention.

The chemosterilants which can be used in the methods of this invention include the following:

N,N'-ethylene-bis(α-chloroacetamide)
N,N'-ethylene-bis(α,α-dichloroacetamide)
N,N'-ethylene-bis(α,α,α-trichloroacetamide)
N,N'-ethylene-bis(α-bromoacetamide)
N,N'-ethylene-bis(α-iodoacetamide)
N,N'-ethylene-bis(α-fluoroacetamide)
N,N'-ethylene-bis(α,α-dibromoacetamide)
N,N'-ethylene-bis(α,α,α-tribromoacetamide)
N,N'-ethylene-bis(α,α-difluoroacetamide)
N,N'-ethylene-bis(α,α,α-trifloroacetamide)
N,N'-ethylene-bis(α,α-diiodoacetamide)

The following example will illustrate the invention. Parts and percent are by weight unless otherwise indicated.

EXAMPLE

Adult flies are fed regular fly food containing N,N'-ethylene-bis(α,α,α-trichloroacetamide) at various concentrations. The regular fly food consists of 6 parts sugar, 6 parts powdered non-fat dry milk and one part powdered egg yolk. Chemosterilant food compositions are prepared by adding 6 ml. of a solution or suspension of N,N'-ethylene-bis(α,α,α-trichloroacetamide) in a volatile solvent to 10 gms. of the regular fly food. The food compositions are allowed to dry, repulverized and placed in emergence cages which contain 100 newly emerged adult flies. Cages containing untreated regular fly food are used as control. All cages are supplied with ample water. After three days the flies are examined and the mortality rate, if any, is noted. When the flies are 6 to 7 days old, one-half inch of moist Chemical Specialties Manufacturers Association medium in a soufflé cup is placed in each cage for oviposition. A few hours later each soufflé cup is removed, filled with water and stirred to separate the egg masses into individual eggs. The eggs from all egg masses are mixed thoroughly and a random sample of 100 eggs from each cage is placed on a small piece of wet black cloth. The black cloth is then placed on moist larval medium in a rearing container. If no eggs are laid, oviposition medium is offered again at intervals of one or two days until it has been offered five times or the flies have oviposited. Three days after oviposition the eggs are examined and the percentage hatched is determined. The larvae that hatch crawal from the cloth into the rearing medium. About 7 days after oviposition the number of pupae are counted to determine the number of larvae that reach the pupal stage of development. Results and further details are given below in Table 1.

TABLE 1

|  | Treated diet | | | Untreated diet | |
|---|---|---|---|---|---|
| Concentration [1] | Mortality [1] | Egg hatch [1] | Pupae [2] | Egg hatch [1] | Pupae [2] |
| 5.0 | 0 | 0 | 0 | 97 | 95 |
| 2.5 | 0 | 0 | 0 | 97 | 95 |
| 1.0 | 0 | 19 | 10 | 95 | 79 |

[1] Expressed as percent.
[2] Actual number.

In carrying out the methods of this invention, the chemosterilants can be used alone or in combination with an adjuvant in liquid, solid or gaseous form. Chemosterilant compositions are prepared by admixing the chemosterilant with an adjuvant including diluents, extenders, carriers and conditioning agents to provide compositions in the form of finely-divided particulate solids, semi-solids, aerosols, solutions and dispersions or emulsions. Thus the chemosterilant can be used with an adjuvant such as a finely-divided particulate solid, a liquid of organic origin, water, a wetting agent, dispersing agent, an emulsifying agent or any suitable combination of these.

Typical finely-divided solid carriers and extenders which can be used in chemosterilant compositions include, for example, the talcs, clays, pumic, silica, diatomaceous earth, quartz, Fuller's earth, salt, sulfur, powdered cork, powdered wood, walnut flour, chalk, tobacco dust, volcanic ash, cottonseed hulls, wheat flour, soybean flour, tripoli, charcoals and the like. Typical liquid diluents include for example, kerosene, Stoddard solvent, hexane, benzene, toluene, water, acetone, ethylene dichloride, xylene, alcohols, Diesel oil, glycols and the like. Typical liquefied gasses for aerosols include, for example, haloalkyls such as dichlorodifluoromethane, fluorotrichloromethane, and the like. Typical semi-solid extenders include, for example, soap, petroleum jelly, and the like.

The chemosterilants also can be employed in conjunction with attractants for the particular insect being controlled. For example, they can be applied to or admixed with attractants or baits such as sucrose, glucose, mollasses, protein mixtures, powdered egg yolk, powdered milk, yellow corn grits, quincy granules, pumice granules, sex attractants, and the like.

Chemosterilant compositions, particularly liquids and wettable particles, usually contain as a conditioning agent one or more surface active agents in amounts sufficient to render a given composition readily dispersible in water or in oil. By the term "surface-active agent" it is understood that wetting-agents, dispersing agents, suspending agents and emulsifying agents are included therein.

The term "chemosterilant composition" as used herein includes not only compositions in a suitable form for application but also concentrated compositions which require dilution or extension with a suitable quantity of liquid or solid adjuvant prior to application.

Surface-active agents which can be used in the chemosterilant compositions are set out, for example, in Searly U.S. Pat. No. 2,426,417, Todd U.S. Pat. No. 2,655,447, Jones U.S. Pat. No. 2,412,510 and Lenher U.S. Pat. No. 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E–607 of the Bureau of Entomology and Plant Quarantine of the U.S.D.A. In general, less than about 50 parts by weight of the surface active agent is present per 100 parts by weight of chemosterilant composition.

The preferred chemosterilant compositions are the wettable powders, dusts, aqueous suspensions or solutions, hydrocarbon solutions and emulsifiable oils.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isethionate, esters of sodium sulfosuccinate, sulfated or sulfonated fatty acid esters, petroleum sulfonates, sulfonated vegetable oils, ditertiary acetylinic glycols and polyoxyethylene derivatives of alkylphenols (particularly isooctylphenol and nonylphenol) and polyoxyethylene derivatives of the mono-higher fatty acid esters of hexitol anhydrides (e.g., sorbitan). Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions usually contain from about 5 to about 95 parts of active ingredient, from 0.25 to about 25 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or antifoaming agent or both.

Dusts are dense finely divided particulate compositions which are intended for application in dry form. Dusts are characterized by their free-flowing and rapid settling properties so that they are not readily wind-borne to areas where they are of no value. Dusts contain primarily an active ingredient and a dense, free-flowing, finely divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for chemosterilant dusts include micaceous talcs, pyrophyllite, dense kaolin clays, ground calcium phosphate rock and tobacco dust.

The wettable powders described above can also be used in the preparation of dusts. While such wettable powders can be used directly in dust form, it is more advantageous to dilute them by blending with the dense dust diluent. In this manner, dispersing agents, corrosion inhibitors and anti-foam agents may also be found as components of a dust.

Emulsifiable oils are usually solutions of active ingredient in water-immiscible or partially water-immiscible solvents together with a surfactant. Suitable solvents include hydrocarbons and certain water-immiscible ethers, esters or ketones. Suitable surfactants are anionic, cationic and non-ionic such as alkyl aryl polyethoxy alcohols, polyethylene sorbitol or sorbitan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 50 parts surfactant and about 4 to 94 parts solvent, all parts being by weight based on the total weight of emulsifiable oil.

The compounds useful in the methods of this invention can be prepared by reacting one mol of ethylene diamine with at least two mols of haloacetyl halide. The reaction is suitably carried out at room temperature, i.e. about 20–25° C. However, higher or lower temperatures can be used, the temperature not being critical. For example, temperatures above about 40° C. are generally employed when no acid acceptor is used.

The reaction is preferably carried out in the presence of an acid acceptor and an inert organic medium. The acid acceptor is generally present in at least equimolar amounts based on the amount of hydrogen halide formed in the reaction. Suitable acid acceptors, e.g. alkaline-acting or basic materials capable of binding the acid evolved in the reaction are the tertiary amines such as trimethylamine, triethylamine, pyridine, quarternary ammonium hydroxides, N-ethylmorpholine and the like; inorganic bases such as sodium hydroxide and potassium hydroxide, sodium carbonate and the like. An excess of amine reactant also serves as an acid acceptor.

Inert organic media which can be used include by way of example hydrocarbons such as benzene, toluene, xylene, cyclohexane, methylcyclohexane, n-heptane, n-hexane and the like; ethers such as isopropyl ether, n-butyl ether, 1,4-dioxane, isobutyl ether, diethyl ether and the like; aliphatic and cycloaliphatic ketones such as methyl isopropyl ketone, methyl isobutyl ketone, methyl isoamyl ketone, diisopropyl ketone, cyclohexanone and the like; organic halides such as carbon tetrachloride, n-butyl chloride, ethylene dichloride, tetrachloroethylene and the like, and dimethylformamide.

The separation of the resulting reaction product from the reaction mixture is readily accomplished. For example the salt, such as a tertiary amine hydrochloride salt formed during the reaction because of the presence of a tertiary amine compound therein as an acid acceptor, is separated from the product containing reaction mixture by simple means such as filtration and the solvent is removed from the resulting filtrate by stripping or distillation, preferably low temperature vacuum distillation. The product can be purified by any of the conventional means well known in the art, e.g. fractional distillation under reduced pressure, selective extraction, fractional distillation using a carrier gas or any suitable combination of these. If desired the product can be subjected to film distillation, recrystallization or a combination of both for further purification.

Although the invention is described with respect to specific modifications, the details thereof are not to be construed as limitations except to the extent indicated in the following claims.

The embodiments of the invention in which an exclusive proprety or privilege is claimed are defined as follows:

1. Method for the control of flies by sterilization which comprises exposing flies to a sterilizing amount of a compound of the formula

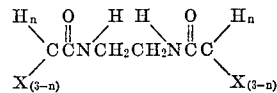

wherein X is halogen and $n$ is an integer from zero to two inclusive.

2. Method of claim 1 wherein X is chlorine.
3. Method of claim 1 wherein X is bromine.
4. Method of claim 1 wherein $n$ is zero.
5. Method of claim 1 wherein $n$ is two.
6. Method of claim 1 wherein the compound is N,N'-ethylene-bis(α-chloroacetamide).
7. Method of claim 1 wherein the compound is N,N'-ethylene-bis(α,α-dichloroacetamide).
8. Method of claim 1 wherein the compound is N,N'-ethylene-bis(α,α,α-trichloroacetamide).

References Cited
UNITED STATES PATENTS

| | | | |
|---|---|---|---|
| 3,085,940 | 4/1963 | Tomcufcik | 424—320 |
| 2,337,313 | 12/1943 | D'Alelio | 260—42 |
| 2,617,747 | 11/1952 | Rasmussen et al. | 117—138.5 |

OTHER REFERENCES

Borkovec, Alexej B., Insect Chemosterilants, Interscience Pub., New York (1966), pp. 15–17 and 41.

Borkovec, Alexej, "Insect Chemosterilants," Interscience Pub., N.Y. (1966), pp. 61–63.

Hamm et al., Herbicidal Activity and Structure, J. Agricultural and Food Chemistry, vol. 4, No. 6, pp. 518, 522, June 1956.

ALBERT T. MEYERS, Primary Examiner

V. D. TURNER, Assistant Examiner